Aug. 8, 1933.  F. FRASER ET AL  1,921,612
PROCESS OF PRODUCING LAMINATED GLASS
Filed Jan. 19, 1931
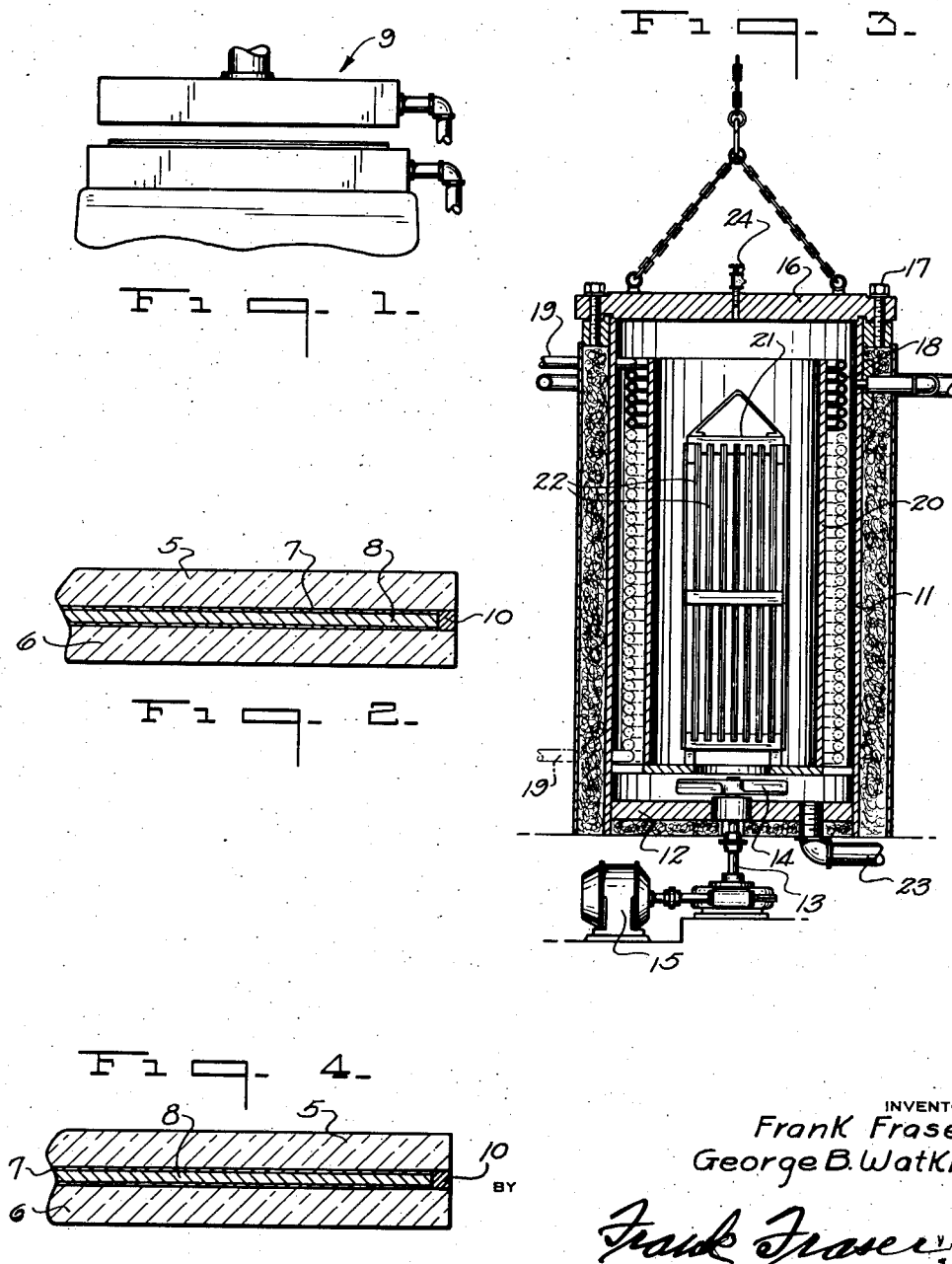
INVENTOR
Frank Fraser
George B. Watkins
BY
Frank Fraser
ATTORNEY

UNITED STATES PATENT OFFICE 1,921,612

PROCESS OF PRODUCING LAMINATED GLASS

Frank Fraser and George B. Watkins, Toledo, Ohio, assignor to Libbey-Owens-Ford Glass Company, Toledo, Ohio, a Corporation of Ohio Application January 19, 1931. Serial No. 509,704

5 Claims. (Cl. 49—81)

The present invention relates to an improved process for use in the manufacture of laminated glass.

Laminated glass is an expression used to designate a composite structure ordinarily consisting of two sheets of glass with an interposed transparent plastic bonded thereto. Usually the plastic is formed from pyroxylin plastic or the like and it or the glass sheets, or both, are coated or otherwise treated with a bond inducing agent. The treated laminations are arranged in proper superimposed relationship to form what is known in the art as a sandwich. To permanently unite or bond the laminations of the sandwich, it is quite usual to subject the same to the combined action of heat and pressure.

The present invention is not limited to the use of any particular plastic or bond inducing agent, but relates more particularly to a method of processing including the application of fluid pressure to the sandwich to give the final pressing thereof.

It is an important object of our invention to provide a process wherein a permanent weather-resisting seal is applied to the sandwich prior to its being subjected to the final bonding pressure.

A further object of our invention is to provide such a process wherein the sandwich is provided with a permanent weather-resisting seal designed to protect the plastic and the bond between the plastic and the glass sheets when the composite structure is in commercial use, after which the sealed sandwich is subjected to the action of fluid under pressure which is preferably heated.

Other objects and advantages of the invention will become more apparent during the course of the following description when taken in connection with the accompanying drawing.

In the drawing wherein like numerals are employed to designate like parts throughout the same, Fig. 1 is a diagrammatic representation of a type of press that may be used to perform one step of our process, Fig. 2 is a fragmentary vertical section through a sandwich of laminated glass, Fig. 3 is a vertical transverse section illustrating one form of fluid pressure apparatus that can be used in connection with the carrying out of our process, and Fig. 4 is a fragmentary vertical section illustrating diagrammatically a finished sheet of laminated glass.

As has already been noted above, the present invention is not limited to the use of any particular plastic or bond inducing agent so that the substances described in connection with our invention are given by way of example only.

To produce the finished laminated sheet, two sheets of glass 5 and 6, illustrated in Fig. 2, after they have been properly cut to size and cleaned, may or may not be coated on one surface with a so-called skin coat or an adhesive or other bond inducing agent indicated generally by the numeral 7. The plastic material 8 is adapted to be interposed between the glass sheets and likewise may have its surfaces treated. Such materials as cellulose compositions, for example, pyroxylin plastic, are satisfactory for use as the plastic. Solvents or mixtures thereof or adhesives can be used between the laminations. After the laminations have been placed in the proper superimposed relationship to produce the sandwich illustrated in Fig. 2, the sandwich may be subjected to a preliminary pressing action. For this purpose, a platen press, such as is indicated in Fig. 1, can be used and obviously any desired cushioning or other means can be interposed between the sandwich and the surfaces of the platen to protect the glass against breakage and the like. It is not necessary to treat the glass any considerable length of time in the press, designated in its entirety by the numeral 9. It has been found in actual practice that the glass has been sufficiently treated after a few minutes in the press at a pressure of about one hundred pounds per square inch and a temperature of approximately 240° F. This preliminary pressing accomplishes the removal of a substantial part of the air and other gases from between the laminations and also brings the contacting surfaces of the laminations into quite intimate contact and bonds them together.

After treatment in the preliminary pressing apparatus and before the application of the finishing pressure, we "seal" the glass with a weather-resisting material. If the plastic membrane 8 is of the same or greater area than the sheets of glass, it is necessary to undercut the preliminary pressed sandwich to the desired depth to give a channel adapted to receive the sealing material. As is shown in Fig. 2, the seal 10 is disposed in a channel formed between the opposing surfaces of the glass sheets 5 and 6. The undercutting of the sandwich can be accomplished in any desired way such as, for example, by means of rotatable saws, wire brushes, acid treatment, or the like.

The present process also permits the use of what is termed "short cut" celluloid. This expression is used to designate the use of a plastic sheet whose area is less than the area of the sheets of glass with which it is associated and the plastic is positioned between the glass sheets in a manner that a suitable channel is left entirely around the edges thereof. When care is exercised in the initial cutting of the plastic and when the plastic is properly lined up between the glass sheets, the necessity of undercutting is obviated. This is important as it eliminates a delicate and costly operation.

Regardless of whether or not the seal receiving channel is formed by the use of "short cut" plastic or by an undercutting operation, the seal 10 is applied to the sandwich after it has been preliminarily pressed and before it has been subjected to the final finishing pressure.

The sealing material may be applied to the sandwich in any desired manner, although we prefer that it be introduced under pressure so that it will be firmly compacted into the channel and completely fill the same. While the process is not limited to any special sealing material, nevertheless it is obvious that a satisfactory weather-resistant substance should be employed so that the bond between the laminations and the plastic will be effectively protected from deleterious effects by climatic conditions, etc. when in commercial use.

The glass is now in condition to be given the final pressing treatment, and this we prefer to do by means of a fluid under pressure, and for this purpose, an autoclave will work satisfactorily. In Fig. 3 is illustrated diagrammatically a form of autoclave or retort that can be used in performing the step of final pressing, although of course it will be appreciated that any desired form of autoclave or the like can be substituted for the one illustrated.

Stated broadly, the autoclave consists of a tank-like member 11 provided with the bottom 12 through which the shaft 13 of the agitating member 14 extends. The shaft 13 has connection with a motor or other driving device 15. The autoclave is also provided with a removable top 16 which can be clamped in position by the bolts or other fastening means 17. In the autoclave illustrated, the heat exchanger system is arranged internally thereof and consists essentially of a series of coils 18 having connection with a source of supply and temperature regulating means through the conduits 19. An inner shell 20 is spaced from the heat exchanger and creates a compartment adapted to receive the rack or racks 21 in which may be supported the sandwiches 22 to be pressed. The fluid can be circulated through the pipes 23.

In operation, the sandwiches, which have been processed as above described, are placed in the rack 21 or other support which is then arranged inside of the autoclave. The top is secured in position and the valve 24 is opened and the fluid circulated into the autoclave. That is, the valve 24 is opened at this time if a liquid type of fluid is to be used. On the other hand, when some forms of gaseous fluid are employed, it may not be necessary to open the valve, so that this step is of course optional. In any event, a fluid is adapted to be placed within the autoclave at a proper pressing temperature and under the desired pressure. The agitator 14 is designed to assist in giving the proper circulation within the autoclave so that a substantially uniform temperature condition will prevail throughout. It may be noted that it is desirable to hold the sandwiches in spaced relation while in the autoclave so that the fluid under pressure will be free to act upon the exposed surfaces of each and all of the sandwiches.

Attention is called to the fact that the sandwiches are not placed in containers or provided with other means to shield the said sandwiches from direct contact with the pressing fluid. It is possible to subject the sandwich to the direct action of the fluid without ill effect provided, of course, the pressing fluid does not eat into the glass itself or adversely affect the seal compound. On the other hand, by applying the seal to the channel prior to the introduction into the autoclave, there is considerable leeway in the matter of choice of pressing fluid.

It has also been found that considerable pressure can be exerted upon the sandwich and consequently the seal while in the autoclave without difficulty. As an example, a pressing cycle of fifteen minutes, 250 pounds pressure per square inch, and at a temperature of 240° F. can be used in the autoclave. The seal 10 prevents the pressing fluid from contacting with the plastic arranged between the glass sheets, and likewise prevents injury to the bond between the laminations.

If the seal 10 is applied carefully in the first instance, in many cases, it will not be necessary to retouch the seal. In some cases, it may be desirable to go over the seal 10 a second time after the glass has been removed from the autoclave to fill any cavities that may exist therein due to a firmer compacting of the seal into the channel during the pressing in the autoclave than was given at the time the seal was initially applied. This is one reason why we prefer to introduce the sealing material into the channel under pressure, as by so doing, the possibility of requiring additional seal is materially minimized.

After removal from the autoclave, the glass is resealed if necessary and then cleaned. Fig. 4 represents the finished sheet and it will be noted that there is no difference between the sheet illustrated in Fig. 4 and that illustrated in Fig. 2.

It has been found that glass processed in this manner is very satisfactory in that the final treatment in the autoclave gives a glass quite uniformly bonded throughout. Furthermore, by applying the seal at the time specified above, we have found that the resultant seal is more satisfactory than if the glass is sealed and not subjected to the pressure such as that given in the autoclave. Also, no special equipment is needed to prevent contact between the pressing fluid and the sandwich.

It is to be understood that the form of the invention herewith shown and described is to be taken as the preferred embodiment of the same, and that various changes in the shape, size and arrangement of parts may be resorted to without departing from the sprit of the invention or the scope of the subjoined claims.

We claim:

1. The process of producing laminated glass, consisting in properly arranging suitably treated laminations in superimposed relationship to produce a sandwich, subjecting the sandwich thus formed to a preliminary pressing operation, then applying a seal to the sandwich, and then subjecting the sandwich including the seal to the action of a fluid under pressure.

2. The process of producing laminated glass, consisting in properly arranging suitably treated laminations in superimposed relationship to produce a sandwich, subjecting the sandwich thus formed to a preliminary pressing operation, then applying a permanent weather-resisting seal to the sandwich, and then subjecting the sandwich including the seal to the action of a fluid under pressure.

3. The process of producing laminated glass, consisting in properly arranging suitably treated laminations in superimposed relationship to produce a sandwich, subjecting the sandwich thus formed to a preliminary pressing operation, then applying a permanent weather-resisting seal to the sandwich, and then subjecting the unprotected sandwich including the seal to the action of a fluid under pressure.

4. The process of producing laminated glass, consisting in properly arranging suitably treated laminations in superimposed relationship to produce a sandwich, subjecting the sandwich thus formed to a preliminary pressing operation, then applying a permanent weather-resisting seal to the sandwich, and then subjecting the unprotected sandwich including the seal to the action of a heated fluid under pressure.

5. The process of producing laminated glass, consisting in properly arranging suitably treated laminations in superimposed relationship to produce a sandwich, subjecting the sandwich to a preliminary pressing operation to remove a material part of the gases therebetween and to bring the faces of the laminations into intimate contact, then undercutting the sandwich to create a seal receiving channel, arranging a weather-resisting material into the channel to form the seal, and then subjecting the sandwich including the seal to the action of a fluid under pressure.

FRANK FRASER.
GEORGE B. WATKINS.